(12) United States Patent
Li et al.

(10) Patent No.: US 11,342,766 B2
(45) Date of Patent: May 24, 2022

(54) SHOPPING CART CHARGING DEVICE AND CHARGING SYSTEM, ESCALATOR, SHOPPING CART

(71) Applicant: BOE TECHNOLOGY GROUP CO., LTD., Beijing (CN)

(72) Inventors: Tailiang Li, Beijing (CN); Yifei Zhang, Beijing (CN); Hongtao Guan, Beijing (CN); Ying Zhang, Beijing (CN); Hua Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 257 days.

(21) Appl. No.: 16/613,733

(22) PCT Filed: May 17, 2019

(86) PCT No.: PCT/CN2019/087445
§ 371 (c)(1),
(2) Date: Nov. 14, 2019

(87) PCT Pub. No.: WO2019/223622
PCT Pub. Date: Nov. 28, 2019

(65) Prior Publication Data
US 2021/0336455 A1 Oct. 28, 2021

(30) Foreign Application Priority Data
May 25, 2018 (CN) .......................... 201820793132.8

(51) Int. Cl.
*H02J 7/00* (2006.01)
*B62B 3/14* (2006.01)
*B62B 5/00* (2006.01)

(52) U.S. Cl.
CPC .............. *H02J 7/0042* (2013.01); *B62B 3/14* (2013.01); *B62B 5/00* (2013.01); *H02J 7/0013* (2013.01); *H02J 7/0047* (2013.01)

(58) Field of Classification Search
CPC ...... H02J 7/0042; H02J 7/0047; H02J 7/0013; H02J 7/00; B62B 5/00; B62B 3/14
See application file for complete search history.

(56) References Cited

U.S. PATENT DOCUMENTS

| | | | |
|---|---|---|---|
| 2008/0231228 A1* | 9/2008 | Fowler | H02J 7/0027 320/107 |
| 2009/0004948 A1* | 1/2009 | Ando | A63H 18/02 446/431 |
| 2018/0315011 A1* | 11/2018 | Clarke | G06Q 20/208 |

FOREIGN PATENT DOCUMENTS

| | | |
|---|---|---|
| CN | 105398918 A | 3/2016 |
| CN | 207077940 U | 3/2018 |
| CN | 207291697 U | 5/2018 |
| CN | 208571637 U | 3/2019 |

* cited by examiner

*Primary Examiner* — Nha T Nguyen

(57) ABSTRACT

A shopping cart charging device, a charging system, an escalator and a shopping cart is disclosed. The shopping cart charging device includes a charging electrode configured to be disposed on a wheel of a shopping cart. The charging electrode is configured to allow electrical connection with a power supply electrode disposed on an escalator, so as to charge the shopping cart.

15 Claims, 6 Drawing Sheets

SHOPPING CART CHARGING DEVICE AND CHARGING SYSTEM, ESCALATOR, SHOPPING CART

This application claims priority to Chinese Patent Application No. 201820793132.8, filed on May 25, 2018, the disclosure of which is incorporated herein by reference in its entirety as part of present application.

TECHNICAL FIELD

The present disclosure relates to a shopping cart charging device and a charging system, an escalator and a shopping cart.

BACKGROUND

With the acceleration of urbanization, supermarkets become more and more popular. Shopping in supermarkets has become a necessary part of ordinary people's life. At the same time, with the rapid development of the Internet of Things, people have put forward higher demands for shopping in supermarket, and shopping carts have come into being. Through the integration of a variety of electronic devices (sensors, RFID devices, infrared code scanning devices, etc.), more comfortable shopping experience is provided to consumers and different consumer needs are satisfied.

In order to ensure the normal operation of the variety of electronic devices mentioned above, the existing shopping carts are generally provided with battery units. When the battery units are short of power, it is necessary to suspend the normal use of the shopping carts and charge their battery units, which affects the service efficiency of shopping carts seriously.

SUMMARY

Embodiments of the disclosure provide a shopping cart charging device, including: a charging electrode, configured to be disposed on a wheels of a shopping cart, wherein the charging electrode is configured to allow electrical connection with a power supply electrode disposed on an escalator, so as to charge the shopping cart.

For example, the shopping cart charging device further includes at least one charging module, disposed on the wheel of the shopping cart. The at least one charging module includes: a plurality of electrode units, each including the charging electrode; and a plurality of ranging sensors which are in one-to-one correspondence to the plurality of electrode units, wherein the plurality of electrode units are disposed on a wheel surface of the wheel of the shopping cart and are uniformly distributed along a circumferential direction of the wheel surface, and the plurality of ranging sensors are disposed on a surface of a wheel axle of the wheel and are uniformly distributed along a circumferential direction of the wheel axle.

For example, each of the plurality of electrode units further includes: a permanent magnet; a spring; and an electromagnet, which is disposed on the wheel surface and is connected with the permanent magnet through the spring, wherein the charging electrode is disposed on a side of the permanent magnet away from the electromagnet.

For example, a count of the at least one charging module is two, and the at least one charging module includes: a first charging module, disposed on a wheel at a side of the shopping cart; and a second charging module, disposed on another wheel at another side of the shopping cart, wherein the first charging module includes a first charging electrode, the second charging module includes a second charging electrode, and a polarity of the first charging electrode is opposite to a polarity of the second charging electrode.

For example, a count of the at least one charging module is one, and the charging electrode includes: a first electrode sheet and a second electrode sheet, which are sequentially disposed along a radial direction of the wheel surface, wherein a polarity of the first electrode sheet is opposite to a polarity of the second electrode sheet.

For example, the shopping cart charging device further includes: an indicator lamp, which is disposed on the shopping cart and configured for indicating a charging state of the shopping cart.

The embodiments of the disclosure provide a shopping cart, including the shopping cart charging device mentioned above and a wheel. The shopping cart charging device is disposed on the wheel.

The embodiments of the disclosure provide a shopping cart charging device. The shopping cart charging device includes a power supply electrode, configured to be disposed on an escalator, wherein the power supply electrode is configured for charging a shopping cart in cooperation with a charging electrode disposed on a wheel of the shopping cart.

For example, the power supply electrode is disposed on a side wall of a convex structure of a surface of the escalator and extends along a length direction of the escalator.

For example, the surface of the escalator is divided into a first area and a second area by a center line of the length direction of the escalator.

For example, the power supply electrode includes: a first power supply electrode, disposed on a convex structure in the first area; and a second power supply electrode, disposed on a convex structure in the second area, a polarity of the first power supply electrode being opposite to a polarity of the second power supply electrode.

For example, the power supply electrode includes a first electrode strip and a second electrode strip which are sequentially disposed in a direction perpendicular to the surface of the escalator, a polarity of the first electrode strip being opposite to a polarity of the second electrode strip.

For example, the shopping cart charging device further includes an insulating layer extending along a top of the convex structure, and an edge of the insulating layer is capable of covering a gap between adjacent convex structures.

The embodiments of the disclosure provide an escalator, which includes the shopping cart charging device mentioned above and a main body, wherein the charging device is disposed at a position on the main body which allows the charging device to charge a shopping cart in cooperation with a charging electrode disposed on a wheel of the shopping cart.

The embodiments of the disclosure provide a shopping cart charging system, which includes the aforementioned shopping cart and the aforementioned escalator.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
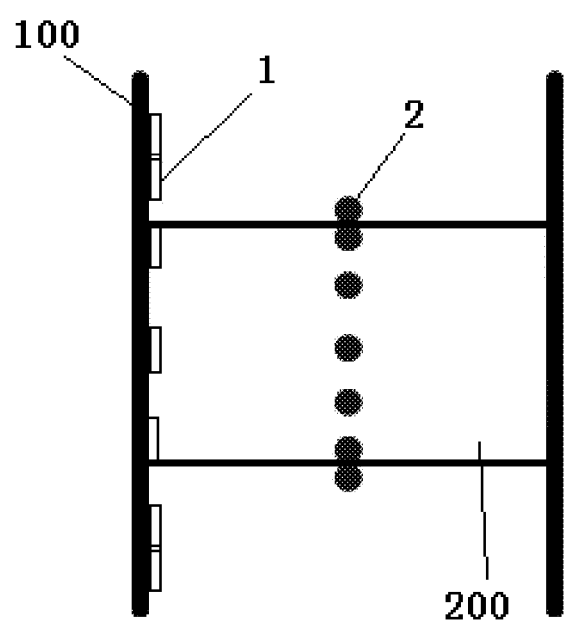
FIG. 1 is a schematic structural diagram of a shopping cart charging device according to at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The present disclosure aims to provide a shopping cart charging device, a charging system, an escalator and a shopping cart, so that the shopping cart can be charged conveniently and the service efficiency of the shopping cart can be improved.

At least one embodiment of the present disclosure provides a shopping cart charging device, which is applied to an application scenario including a shopping cart. Specifically, a wheel of the shopping cart includes a wheel axle and wheel surfaces coaxially disposed at both ends of the wheel axle. A plurality of convex structures are disposed on a surface of an escalator along a length direction of the escalator. In a case where the shopping cart is pushed onto the escalator, due to gravity of the shopping cart, the convex structure on the surface of the escalator can be embedded within an area formed by the wheel surfaces and the wheel axle, and the shopping cart is fixed on the surface of the escalator through friction.

In at least one embodiment of the present disclosure, the shopping cart charging device is applied to a shopping cart and includes a charging electrode disposed on the wheel of the shopping cart.

Correspondingly, at least one embodiment of the present disclosure also provides a shopping cart charging device, which is applied to an escalator and includes a power supply electrode disposed on the escalator.

In a case where the shopping cart is in use, after the shopping cart is pushed onto the escalator, based on the contact relationship between the escalator and the wheel of the shopping cart, the charging electrode on the wheel of the shopping cart can contact the power supply electrode on the escalator, so as to conduct a charging loop to charge the shopping cart.

Figure 2:
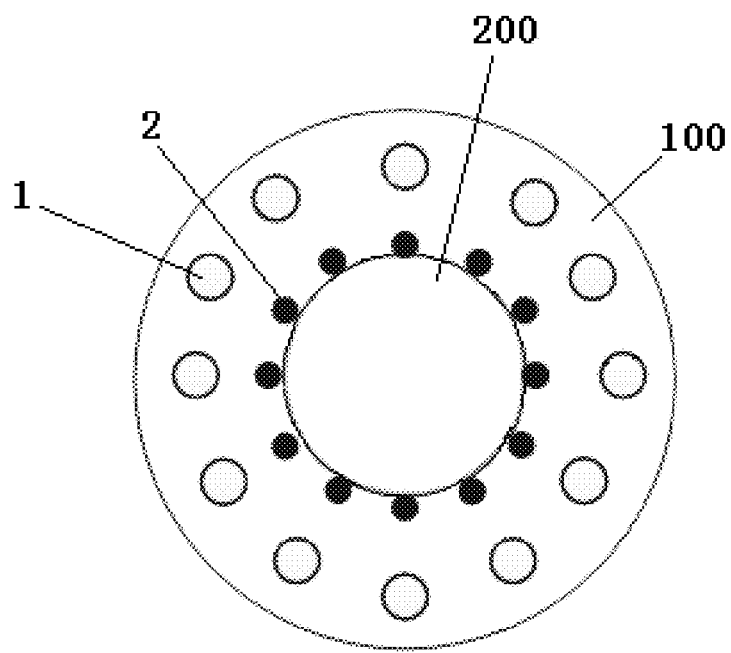
FIG. 2 is a schematic cross-sectional structural diagram of a shopping cart charging device according to at least one embodiment of the present disclosure.

In at least one embodiment of the present disclosure, referring to FIG. 1 and FIG. 2, the shopping cart charging device is applied to a shopping cart. The shopping cart charging device includes at least one charging module disposed on a wheel of the shopping cart. For one charging module, it includes a plurality of electrode units 1, and a plurality of ranging sensors 2 which are in one-to-one correspondence to the plurality of electrode units 1. The plurality of electrode units 1 are disposed on a wheel surface 100 of a wheel of the shopping cart and are uniformly distributed along a circumferential direction of the wheel surface 100. The plurality of ranging sensors 2 are disposed on a surface of a wheel axle 200 of the wheel and are uniformly distributed along a circumferential direction of the wheel axle 200. Based on the one-to-one correspondence relationship of the plurality of electrode units 1 and the plurality of ranging sensors 2 and the uniform distributions thereof along the circumferential direction, a group consisting of an electrode unit 1 and a ranging sensor 2 that are corresponding to each other, is located in a radial direction of the wheel face 100.

Figure 3:
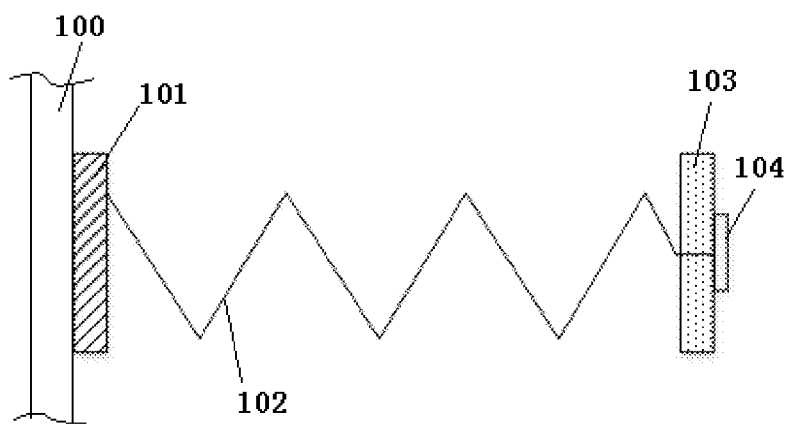
FIG. 3 is a schematic diagram of an electrode unit in a released state according to at least one embodiment of the present disclosure.
Figure 4:
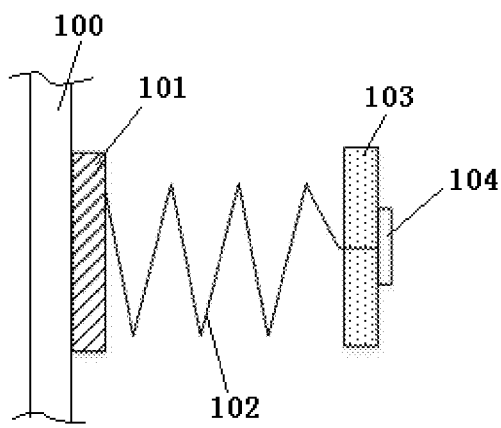
FIG. 4 is a schematic diagram of an electrode unit in a retracted state according to at least one embodiment of the present disclosure.

For example, for one electrode unit 1, referring to FIG. 3 and FIG. 4, it includes an electromagnet 101, a spring 102, a permanent magnet 103, and a charging electrode 104. Among them, the electromagnet 101 is disposed on the wheel surface 100, and the electromagnet 101 is connected with the permanent magnet 103 through the spring 102. The charging electrode 104 is disposed on a side of the permanent magnet 103 away from the electromagnet 101. The charging electrode 104 is connected to a battery of the shopping cart, and is configured to charge the shopping cart in cooperation with a power supply electrode disposed on a convex structure of a surface of the escalator. In at least one embodiment of the present disclosure, the electrode unit 1 has two states of being retracted and being released. In a case where the shopping cart is in a non-charging state, the electrode unit 1 is in a retracted state, as shown in FIG. 4. In this case, the electromagnet 101 is powered on, and a magnetic polarity of the electromagnet 101 is opposite to a magnetic polarity of the permanent magnet 103. Thus, an attractive force is generated therebetween, and the permanent magnet 103 is attracted to the vicinity of the wheel surface 100 by the electromagnet 101 fixed on the wheel surface 100, and the spring 102 is compressed. In a case where the shopping cart is in a charging state, the electrode unit 1 is in a released state, as shown in FIG. 3, the electromagnet 101 is powered off, and the magnetic polarity of the electromagnet 101 is lost. Thus, the attractive force between the electromagnet 101 having lost magnetic polarity and the permanent magnet 103 is lost. An elastic force of the spring 102 being compressed in the non-charging state causes the permanent magnet 103 to be ejected away from the electromagnet 101, and the charging electrode 104 on the permanent magnet 103 is made to contact the power supply electrode on the convex structure of the surface of the escalator so as to conduct a charging loop to charge the shopping cart.

Figure 5:
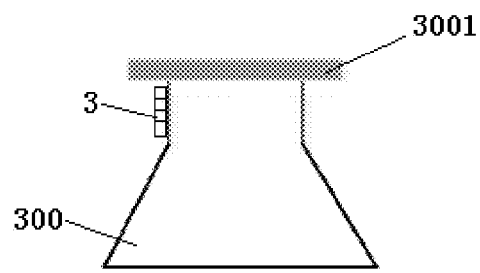
FIG. 5 is a schematic diagram of a shopping cart charging device according to at least one embodiment of the present disclosure.

Referring to FIG. 5, at least one embodiment of the present disclosure also provides a shopping cart charging device, which can be applied to an escalator. The shopping cart charging device includes a power supply electrode 3, which is disposed on a side wall of a convex structure 300 of a surface of the escalator and extends along a length direction of the escalator and configured for charging the shopping cart in cooperation with the charging electrode in the charging module disposed on the wheel of the shopping cart.

Figure 6:
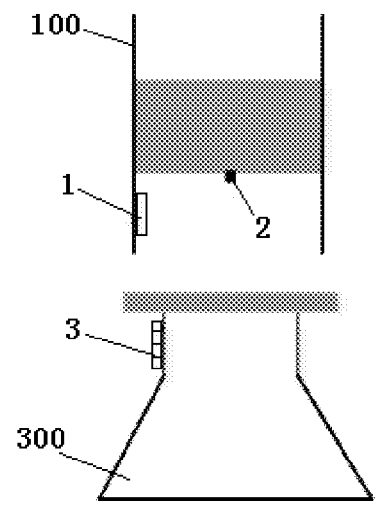
FIG. 6 is a schematic diagram of a corresponding relationship between an electrode unit and a power supply electrode in at least one embodiment of the disclosure.
Figure 7:
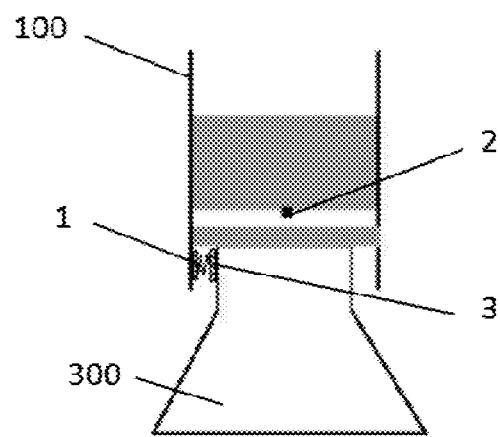
FIG. 7 is a schematic diagram of a matching form of a shopping cart charging device in a charging state according to at least one embodiment of the present disclosure.

In a case where the shopping cart is in use, a user only needs to push the shopping cart onto the escalator, and then the shopping cart is going to be charged. Specifically, referring to FIG. 6 and FIG. 7, after the shopping cart is pushed onto the escalator, due to gravity of the shopping cart, the convex structure on the surface of the escalator can be embedded within an area formed by the wheel surfaces and the wheel axle (that is, part of the wheel surfaces will be below the surface of the escalator), and the shopping cart is fixed on the surface of the escalator though friction.

In order to realize charging at any position after a user pushes the shopping cart onto the escalator, in at least one embodiment of the present disclosure, a plurality of electrode units are provided. The plurality of electrode units are uniformly distributed along the circumferential direction of the wheel surface 100 of the wheel, so as to ensure that at least one electrode unit is included in an area of the wheel surface 100 below the surface of the escalator and a charging electrode 104 in the electrode unit faces the convex structure 300 of the surface of the escalator.

Further, the plurality of ranging sensors 2 are used to determine which electrode unit completes charging. For the electrode units 1 in the area of the wheel surface 100 below the surface of the escalator, in order to ensure that the electrode unit can be smoothly switched from the retracted state to the released state without mechanical interference with the structure of the escalator, it is necessary to select one electrode unit 1 which is farthest from the surface of the escalator. As for the electrode unit 1 farthest from the surface of the escalator, it is obvious that its corresponding ranging sensor 2 is closest to the surface of the escalator, that is to say, a range reading of the corresponding ranging sensor 2 is minimal. Therefore, after the shopping cart is pushed and fixed onto the escalator, the range readings of the plurality of ranging sensors 2 are detected by an on-board controller of the shopping cart and a ranging sensor 2 having the minimal range reading is selected. Then, the electrode unit 1 corresponding to the ranging sensor 2 having the minimal range reading is used to charge the shopping cart. The electrode unit 1 is initially in a retracted state. Referring to FIG. 3 and FIG. 4, the electromagnet 101 in the electrode unit 1 is powered off, and the permanent magnet 103 is ejected away by the spring 102. The charging electrode 104 is made to contact the power supply electrode 3 on the convex structure 300 of the surface of the escalator facing the charging electrode 104, so as to conduct a charging loop to charge the shopping cart.

For example, in the shopping cart charging device disposed on the shopping cart, a specific arrangement form of the charging modules is as follows: a count of the charging modules is two, and the charging modules include a first charging module disposed on a wheel at a side of the shopping cart and a second charging module disposed on another wheel at another side of the shopping cart.

In at least one embodiment of the present disclosure, two charging modules are respectively disposed on wheels at both sides of the shopping cart. And the two charging modules serve as a positive electrode and a negative electrode, respectively. The structure of the first charging module and the structure of the second charging module are the same as that of the charging module in the aforementioned embodiment, and the prefixes of "first" and "second" are only used for distinguishing that the two charging modules are respectively disposed on wheels at different sides of the shopping cart. Specifically, the first charging module includes a first charging electrode; the second charging module includes a second charging electrode. Herein, the first charging electrode and the second charging electrode are both the same as the charging electrode in the aforementioned embodiment. The prefixes of "first" and "second" are only used for distinguishing polarities of the first charging electrode and the second charging electrode, and the polarities of the first charging electrode and the second charging electrode are set opposite to each other.

In at least one embodiment of the present disclosure, for example, the first charging electrode is connected to a negative electrode of the battery of the shopping cart, and the second charging electrode is connected to a positive electrode of the battery of the shopping cart. That is, from the perspective of a user, in at least one embodiment of the present disclosure, a first charging module is disposed on a wheel at the left side of the shopping cart and is used as a negative electrode for charging; a second charging module is disposed on a wheel at the right side of the shopping cart and is used as a positive electrode for charging.

Figure 8:
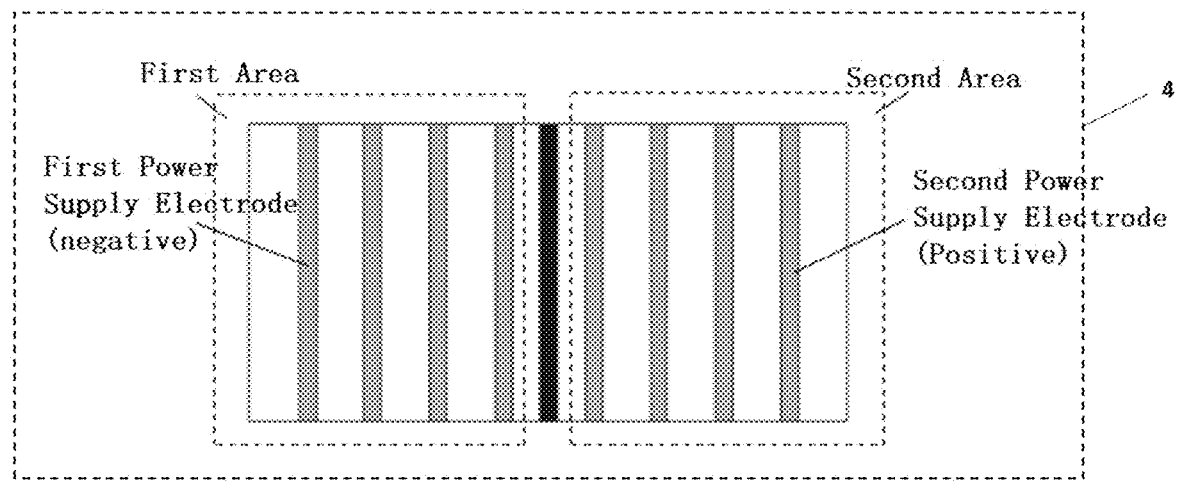
FIG. 8 is a schematic diagram of a surface of an escalator according to at least one embodiment of the present disclosure.

For example, in a shopping cart charging device according to at least one embodiment of the present disclosure, referring to FIG. 8, the surface of the escalator on a main body 4 is divided into a first area and a second area by a center line of the length direction of the escalator. The first area and the second area are separated by an insulating strip extending along the center line of the length direction of the escalator. In at least one embodiment of the present disclosure, the power supply electrode includes a first power supply electrode disposed on a convex structure in the first area, and a second power supply electrode disposed on a convex structure in the second area. The first power supply electrode and the second power supply electrode have opposite polarities. The first power supply electrode and the second power supply electrode are both the same as the power supply electrode in the aforementioned embodiment, and the prefixes of "first" and "second" are only used for distinguishing the areas in which they are located and the polarities thereof, and the polarities of the first charging electrode and the second charging electrode are set opposite to each other. Corresponding to the above example, the first power supply electrode on the convex structure in the first area is connected to a negative electrode of a power supply, and the second power supply electrode on the convex structure in the second area is connected to a positive electrode of the power supply.

In a case where the shopping cart is in use, after the shopping cart is pushed and fixed onto the escalator, the wheel with the first charging module at the left side of the shopping cart falls into the first area, and the wheel with the second charging module at the right side of the shopping cart falls into the second area. Accordingly, after the electrode units are switched from the retracted state to the released state, which is a same process as that in the aforementioned embodiment, the first charging electrode is contacted with the first power supply electrode, and the second charging electrode is contacted with the second power supply electrode. Thus the charging of the shopping cart is realized.

Figure 9:
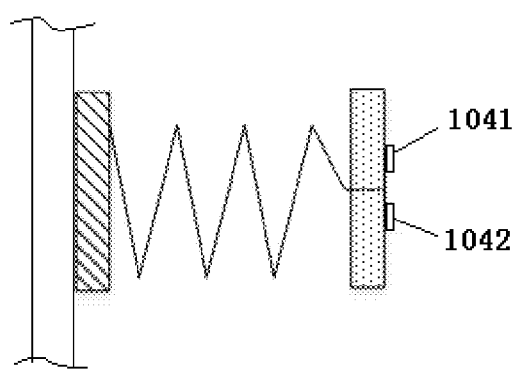
FIG. 9 is a schematic diagram of a charging electrode according to at least one embodiment of the present disclosure.

For example, in the shopping cart charging device disposed on the shopping cart according to the embodiment of the present disclosure, a specific arrangement form of the charging modules is as follows: a count of the charging modules is one. Referring to FIG. 9, the charging electrode includes a first electrode sheet 1041 and a second electrode sheet 1042 which are sequentially disposed along a radial direction of the wheel surface; and the first electrode sheet 1041 and the second electrode sheet 1042 have opposite polarities. In at least one embodiment of the present disclosure, the first electrode sheet 1041 and the second electrode sheet 1042 serve as a positive electrode and a negative electrode, respectively. The first electrode sheet 1041 and the second electrode sheet 1042 are disposed on a permanent magnet in one electrode unit, so that only one wheel in the whole shopping cart is provided with a charging module thereon.

Figure 10:
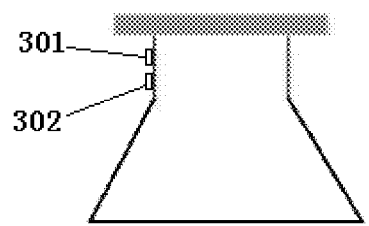
FIG. 10 is a schematic diagram of a power supply electrode according to at least one embodiment of the present disclosure.

For example, in the shopping cart charging device according to at least one embodiment of the present disclosure, referring to FIG. 10, the power supply electrode includes: a first electrode strip 301 and a second electrode strip 302 sequentially disposed in a direction perpendicular to the surface of the escalator; and the first electrode strip 301 and the second electrode strip 302 have opposite polarities.

In a case where the shopping cart is in use, after the shopping cart is pushed and fixed onto the escalator, after the electrode unit is switched from the retracted state to the released state, which is a same process as that in the aforementioned embodiment, the first electrode sheet 1041 contacts the first electrode strip 301, and the second electrode sheet 1042 contacts the second electrode strip 302, thus the charging of the shopping cart is realized.

For example, the shopping cart charging device disposed on the shopping cart further includes: an indicator lamp disposed on the body of the shopping cart. The indicator lamp is configured for indicating a charging state of the shopping cart. The indicator lamp works in two different ways corresponding to two charging states of normal charging and non-normal charging. Specifically, when the contact between the charging electrode and the power supply electrode is good and a normal charging of the shopping cart is enabled, the indicator lamp goes out; when the contact between the charging electrode and the power supply electrode is poor or fails and normal charging of the shopping cart is not enabled, the indicator lamp will be lit up. The lighted indicator lamp can inform the user of the current charging state of the shopping cart in real time. Obviously, the indicator lamp can be set to work in different ways, such as different brightness, different colors, different blinking frequencies, etc.

For example, referring to FIG. 5, a shopping cart charging device according to at least one embodiment of the present disclosure further includes an insulating layer 3001 extending along a top of the convex structure 300, and an edge of the insulating layer 3001 is capable of covering a gap between adjacent convex structures 300. By setting the insulating layer 3001, the charging electrode and the power supply electrode can be separated from other parts of the shopping cart and the escalator, thereby improving the insulating property. On the other hand, the insulating layer 3001 can also effectively increase the friction with the wheel surface of the wheel of the shopping cart, thereby further improving the stability of the shopping cart fixed on the surface of the escalator.

The embodiments of the disclosure provide an escalator, which includes the shopping cart charging device described above and a main body 4. The charging device is disposed at a position on the main body 4 which allows the charging device to charge the shopping cart in cooperation with the charging electrode disposed on the wheel of the shopping cart.

The embodiments of the disclosure provides a shopping cart charging system, which includes the aforementioned shopping cart and the aforementioned escalator. For the shopping cart charging device, the charging system, the escalator and the shopping cart according to at least one embodiment of the present disclosure, they can also realize more functions by interacting with a server in a store through the on-board controller and communication module on the shopping cart, and those functions include:

(1) feeding back the current battery power quantity of the shopping cart to the server through the communication module. Further, according to the current battery power quantity of the shopping cart, it is determined whether charging is needed.

(2) determining the position of the shopping cart in the store through an indoor positioning system. Further, through an electronic tag disposed on the shopping cart and a reading device disposed on the escalator, the event that the shopping cart enters and leaves the escalator is determined. And when the shopping cart leaves the escalator, the electrode unit is switched from the released state to the retracted state. Or, according to a count of shopping carts currently being charged on the escalator, it is determined whether the shopping cart newly entering the escalator is able to be charged or not.

In summary, the shopping cart charging device, the charging system, the escalator and the shopping cart provided by the present disclosure can charge the shopping cart when the shopping cart is pushed onto the escalator, by matching the charging electrode in the electrode unit included in the charging module on the wheel of the shopping cart with the power supply electrode disposed on the convex structure of the surface of the escalator, and they are simple in structure, convenient and fast for utilization, and the service efficiency of the shopping cart can be improved.

The above description is merely exemplary embodiments of the present disclosure and is not intended to limit the scope of protection of the present disclosure. The scope of protection of the present disclosure is determined by the appended claims.

What is claimed is:

1. A shopping cart charging device, comprising:
a charging electrode, configured to be disposed on a wheel of a shopping cart, wherein the charging electrode is configured to allow electrical connection with a power supply electrode disposed on an escalator, so as to charge the shopping cart; and
at least one charging module, disposed on at least one wheel of the shopping cart, the at least one charging module comprising:
a plurality of electrode units, each comprising the charging electrode; and
a plurality of ranging sensors which are in one-to-one correspondence to the plurality of electrode units,
wherein the plurality of electrode units are disposed on a wheel surface of the wheel of the shopping cart and are uniformly distributed along a circumferential direction of the wheel surface, and the plurality of ranging sensors are disposed on a surface of a wheel axle of the wheel and are uniformly distributed along a circumferential direction of the wheel axle.

2. The shopping cart charging device according to claim 1, wherein each of the plurality of electrode units further comprises:
a permanent magnet;
a spring; and
an electromagnet, disposed on the wheel surface and connected with the permanent magnet through the spring,
wherein the charging electrode is disposed on a side of the permanent magnet away from the electromagnet.

3. The shopping cart charging device according to claim 2, wherein a count of the at least one charging module is two, the at least one wheel comprises a first wheel at a side of the shopping cart and a second wheel at another side of the shopping cart, and the at least one charging module comprises:
a first charging module, disposed on the first wheel; and
a second charging module, disposed on the second wheel,
wherein the first charging module comprises a first charging electrode, the second charging module comprises a second charging electrode, and a polarity of the first charging electrode is opposite to a polarity of the second charging electrode.

4. The shopping cart charging device according to claim 2, wherein a count of the at least one charging module is one, and the charging electrode comprises:
a first electrode sheet and a second electrode sheet, which are sequentially disposed along a radial direction of the wheel surface, wherein a polarity of the first electrode sheet is opposite to a polarity of the second electrode sheet.

5. The shopping cart charging device according to claim 1, wherein a count of the at least one charging module is two, the at least one wheel comprises a first wheel at a side of the shopping cart and a second wheel at another side of the shopping cart, and the at least one charging module comprises:
a first charging module, disposed on the first wheel; and
a second charging module, disposed on the second wheel,
wherein the first charging module comprises a first charging electrode, the second charging module comprises a second charging electrode, and a polarity of the first charging electrode is opposite to a polarity of the second charging electrode.

6. The shopping cart charging device according to claim 1, wherein a count of the at least one charging module is one, and the charging electrode comprises:
a first electrode sheet and a second electrode sheet, which are sequentially disposed along a radial direction of the wheel surface, wherein a polarity of the first electrode sheet is opposite to a polarity of the second electrode sheet.

7. The shopping cart charging device according to claim 2, further comprising:
an indicator lamp, disposed on the shopping cart and configured for indicating a charging state of the shopping cart.

8. A shopping cart, comprising: the shopping cart charging device according to claim 1 and a wheel,
wherein the shopping cart charging device is disposed on the wheel.

9. A shopping cart charging device, comprising:
a power supply electrode, configured to be disposed on an escalator, wherein the power supply electrode is configured for charging a shopping cart in cooperation with a charging electrode disposed on a wheel of the shopping cart,
wherein the power supply electrode is disposed on a side wall of at least one convex structure of a surface of the escalator and extends along a length direction of the escalator.

10. The shopping cart charging device according to claim 9, wherein the surface of the escalator is divided into a first area and a second area by a center line of the length direction of the escalator.

11. The shopping cart charging device according to claim 10, wherein the at least one convex structure comprises a first convex structure in the first area and a second convex structure in the second area, the power supply electrode comprises:
a first power supply electrode, disposed on the first convex structure; and
a second power supply electrode, disposed on the second convex structure, a polarity of the first power supply electrode being opposite to a polarity of the second power supply electrode.

12. The shopping cart charging device according to claim 9, wherein the power supply electrode comprises:
a first electrode strip and a second electrode strip which are sequentially disposed in a direction perpendicular to the surface of the escalator, a polarity of the first electrode strip being opposite to a polarity of the second electrode strip.

13. The shopping cart charging device according to claim 9, further comprising:
an insulating layer, wherein the insulating layer extends along a top of the at least one convex structure, the at least one convex structure comprises a plurality of convex structure, and an edge of the insulating layer is capable of covering a gap between adjacent convex structures.

14. An escalator, comprising the shopping cart charging device according to claim 9 and a main body,
wherein the charging device is disposed at a position on the main body which allows the charging device to charge a shopping cart in cooperation with a charging electrode disposed on a wheel of the shopping cart.

15. A shopping cart charging system, comprising: a shopping cart and an escalator; wherein
the shopping cart comprises a wheel and a first shopping cart charging device disposed on the wheel, the first shopping cart charging device comprises a charging electrode configured to be disposed on the wheel of the shopping cart, the charging electrode is configured to allow electrical connection with a power supply electrode disposed on the escalator, so as to charge the shopping cart;

the first shopping cart charging device further comprises at least one charging module, disposed on at least one wheel of the shopping cart, the at least one charging module comprises:

a plurality of electrode units, each comprising the charging electrode; and a plurality of ranging sensors which are in one-to-one correspondence to the plurality of electrode units, wherein the plurality of electrode units are disposed on a wheel surface of the wheel of the shopping cart and are uniformly distributed along a circumferential direction of the wheel surface, and the plurality of ranging sensors are disposed on a surface of a wheel axle of the wheel and are uniformly distributed along a circumferential direction of the wheel axle;

the escalator comprises a main body and a second shopping cart charging device disposed at a position on the main body which allows the second shopping cart charging device to charge the shopping cart in cooperation with the charging electrode disposed on the wheel of the shopping cart, the second shopping cart charging device comprises a power supply electrode configured to be disposed on the escalator, the power supply electrode is configured for charging the shopping cart in cooperation with the charging electrode disposed on the wheel of the shopping cart.

* * * * *